(12) United States Patent
Kestler et al.

(10) Patent No.: US 12,012,212 B2
(45) Date of Patent: Jun. 18, 2024

(54) MICROWAVE THERMAL ANTI-ICING SYSTEM FOR AIRCRAFT ACOUSTIC STRUCTURE

(71) Applicant: Rohr, Inc., Chula Vista, CA (US)

(72) Inventors: Steven M. Kestler, San Diego, CA (US); Joseph V. Mantese, Ellington, CT (US)

(73) Assignee: ROHR, INC., Chula Vista, CA (US)

( * ) Notice: Subject to any disclaimer, the term of this patent is extended or adjusted under 35 U.S.C. 154(b) by 394 days.

(21) Appl. No.: 17/363,424

(22) Filed: Jun. 30, 2021

(65) Prior Publication Data
US 2023/0002065 A1    Jan. 5, 2023

(51) Int. Cl.
| | | |
|---|---|---|
| *B64D 15/00* | (2006.01) | |
| *B32B 3/26* | (2006.01) | |
| *B32B 15/08* | (2006.01) | |
| *B64D 33/02* | (2006.01) | |
| *G10K 11/168* | (2006.01) | |
| *H05B 6/64* | (2006.01) | |
| *H05B 6/66* | (2006.01) | |
| *H05B 6/70* | (2006.01) | |

(52) U.S. Cl.
CPC .............. *B64D 15/00* (2013.01); *B32B 3/266* (2013.01); *B32B 15/08* (2013.01); *G10K 11/168* (2013.01); *H05B 6/6491* (2013.01); *H05B 6/707* (2013.01); *B32B 2605/18* (2013.01); *B64D 2033/0206* (2013.01); *B64D 2033/0233* (2013.01); *H05B 6/66* (2013.01); *H05B 2214/02* (2013.01)

(58) Field of Classification Search
CPC . F02C 7/04; F02C 7/045; F02C 7/047; B64D 15/00; B64D 15/20; B64D 15/22; B64D 2033/0233; F01D 25/02
See application file for complete search history.

(56) References Cited

U.S. PATENT DOCUMENTS

| | | | | |
|---|---|---|---|---|
| 4,060,212 A | * | 11/1977 | Magenheim | H05B 6/80 |
| | | | | 219/703 |
| 4,365,131 A | | 12/1982 | Hansman, Jr. | |
| 5,061,836 A | | 10/1991 | Martin | |
| 5,615,849 A | | 4/1997 | Salisbury | |

(Continued)

FOREIGN PATENT DOCUMENTS

| | | | | |
|---|---|---|---|---|
| CN | 109050938 A | | 12/2018 | |
| EP | 3231252 B1 | | 12/2018 | |
| FR | 3096658 A1 | * | 12/2020 | ............ B64D 15/12 |

OTHER PUBLICATIONS

Akinyemi et al., "Design and Development of a 2.4 GHz Slot Antenna", The Pacific Journal of Science and Technology, vol. 18, No. 2, Nov. 2017.

(Continued)

*Primary Examiner* — Alain Chau
(74) *Attorney, Agent, or Firm* — Getz Balich LLC (57) ABSTRACT

An assembly is provided for an aircraft structure. This aircraft structure assembly includes an acoustic panel and a thermal anti-icing system. The acoustic panel includes an exterior surface. The thermal anti-icing system includes a susceptor and a microwave system. The susceptor is configured with the acoustic panel. The microwave system is configured to direct microwaves to the susceptor for melting and/or preventing ice accumulation on the exterior surface.

15 Claims, 9 Drawing Sheets

(56) References Cited

U.S. PATENT DOCUMENTS

| | | | |
|---|---|---|---|
| 5,623,821 | A | 4/1997 | Bouiller |
| 6,207,940 | B1 | 3/2001 | Feher |
| 6,610,969 | B2 * | 8/2003 | Feher ................. F03D 80/40 |
| | | | 219/703 |
| 6,642,490 | B2 * | 11/2003 | Feher ................. F02C 7/047 |
| | | | 219/703 |
| 6,787,744 | B1 | 9/2004 | Feher |
| 8,997,451 | B2 | 4/2015 | Dufresne De Virel |
| 9,056,684 | B2 | 6/2015 | McCollough |
| 9,469,408 | B1 * | 10/2016 | Elangovan ............ B64D 33/02 |
| 11,421,547 | B2 * | 8/2022 | Kestler ................. F02C 7/047 |
| 2003/0015524 | A1 * | 1/2003 | Feher ................. B64D 15/12 |
| | | | 219/703 |
| 2003/0052230 | A1 * | 3/2003 | Feher ................. H05B 6/80 |
| | | | 244/134 R |
| 2011/0099970 | A1 * | 5/2011 | Zhang ................. H05B 6/80 |
| | | | 219/679 |
| 2015/0083863 | A1 | 3/2015 | Karthäuser |
| 2017/0057618 | A1 | 3/2017 | Khozikov |
| 2019/0118955 | A1 | 4/2019 | Porte |
| 2020/0164990 | A1 * | 5/2020 | Wilson ................. B64D 15/00 |
| 2021/0129997 | A1 * | 5/2021 | Kestler ................. B64D 33/02 |
| 2021/0207491 | A1 * | 7/2021 | Kestler ................. F02C 7/047 |

OTHER PUBLICATIONS

Dan Viza, "Modernizing RF and Microwave Power Applications", Freescale Technology Forum 2014, http://cache.freescale.com/files/training/doc/ftf/2014/FTF-IND-F0408.pdf.

Glenn Oliver, "Low-Loss Materials in High Frequency Electronics and the Challenges of Measurement", Feb. 4, 2015, https://wiki.epfl.ch/thz/documents/Materials%20and%20Measurements%20-%20DuPont%20-%20Feb2015.pdf.

Harbour Industries, "RF Microwave Coaxial Cable", https://www.iewc.com/-/media/iewcglobal/files/literature/us/manufacturers/harbour-industries/rf-microwave-coax-cable-catalog.pdf.

EP search report for EP22182405.5 dated Oct. 28, 2022.

* cited by examiner

MICROWAVE THERMAL ANTI-ICING SYSTEM FOR AIRCRAFT ACOUSTIC STRUCTURE

BACKGROUND

1. Technical Field

This disclosure relates generally to an aircraft system and, more particularly, to a thermal anti-icing system for the aircraft system.

2. Background Information

A modern aircraft propulsion system typically includes a gas turbine engine housed within a nacelle. The nacelle includes an inlet structure for directing incoming air to the gas turbine engine. This inlet structure includes an inlet lip, an inner barrel and an outer barrel. The inlet lip forms a leading edge of the inlet structure. The inner barrel is connected to a radial inner end of the inlet lip, and at least partially forms an outer peripheral boundary of an inlet duct into the aircraft propulsion system. The outer barrel is connected to a radial outer end of the inlet lip, and circumscribes the inner barrel.

Under certain environmental conditions, the inlet lip may be susceptible to ice accumulation. To melt ice that may accumulate on the inlet lip, the inlet structure may be configured with a thermal anti-icing system. A lip skin of the inlet lip, for example, may be configured with an electrical resistance heater. Such an electrical resistance heater may be attached to an interior surface of the lip skin to minimize a thermal conduction path length from the heater to an exterior surface of the lip skin/the inlet lip. While such electrical resistance heaters have various benefits, there is still room in the art for improvement. Damage to the lip skin and the electrical resistance heater arranged therewith following a foreign object impact, for example, may render a portion of or the entire electrical resistance heater inoperable where the damage severs one or more electrical resistance circuits within the electrical resistance heater.

It is known to configure the inlet structure with one or more acoustic panels for attenuating sound (e.g., noise) generated by the gas turbine engine. Some efforts have been made to integrate such acoustic panels into the inlet lip. Acoustic panels, however, are difficult to de-ice. A typical acoustic panel, for example, includes a perforated face skin, a back skin and a honeycomb core between the face and the back skins. The honeycomb core includes a plurality of cavities that extend between the face and the back skins. While the cavities facilitate sound attenuation, these cavities also thermally insulate the face skin from the back skin. It is therefore difficult to integrate an electrical resistance heater with an acoustic panel, particularly where the heater is designed to be attached to an interior-most surface of the acoustic panel.

Generally speaking, efficiency of the aircraft propulsion system may be increased by, inter alia, reducing weight and size of the aircraft propulsion system. Shortening the inlet structure is one known way to reduce the weight and the size of the aircraft propulsion system. However, certain thermal de-icing requirements and certain sound attenuation requirements currently provide obstacles to reducing the weight and the size of the inlet structure further. There is a need in the art therefore for improved systems and structures which can facilitate reducing weight and/or size of a nacelle inlet structure.

SUMMARY OF THE DISCLOSURE

According to an aspect of the present disclosure, an assembly is provided for an aircraft structure. This aircraft structure assembly includes an acoustic panel and a thermal anti-icing system. The acoustic panel includes an exterior surface. The thermal anti-icing system includes a susceptor and a microwave system. The susceptor is configured with the acoustic panel. The microwave system is configured to direct microwaves to the susceptor for melting and/or preventing ice accumulation on the exterior surface.

According to another aspect of the present disclosure, an assembly is provided for an aircraft propulsion system. This aircraft propulsion system assembly includes a nacelle structure and a thermal anti-icing system. The nacelle structure includes a perforated first skin, a second skin and a cellular core arranged between and connected to the perforated first skin and the second skin. The thermal anti-icing system includes a susceptor and a microwave system. The susceptor forms at least a part of the perforated first skin. The microwave system is configured to direct microwaves through the cellular core to the susceptor for melting and/or preventing ice accumulation on a perforated exterior surface of the nacelle structure.

According to still another aspect of the present disclosure, another assembly is provided for an aircraft propulsion system. This aircraft propulsion system assembly includes a nacelle structure and a thermal anti-icing system. The nacelle structure includes a perforated first skin, a second skin and a cellular core arranged between and connected to the perforated first skin and the second skin. The thermal anti-icing system includes a susceptor and a microwave system. The susceptor is connected to the perforated first skin. The microwave system is configured to direct microwaves through the cellular core to the susceptor for melting and/or preventing ice accumulation on a perforated exterior surface of the nacelle structure.

The microwave system may include a microwave source and a waveguide. The microwave source may be configured to generate the microwaves. The waveguide may be arranged with the second skin. The waveguide may be configured to receive the microwaves from the microwave source and then direct the microwaves to the susceptor.

The acoustic panel may include a first skin, a second skin and a core. The core may be connected to the first skin and the second skin. The core may form a plurality of cavities between the first skin and the second skin. Each of the cavities may be fluidly coupled with one or more respective perforations through the first skin. The susceptor may be configured with the first skin.

The susceptor may at least partially form the first skin.

The susceptor may be bonded to the first skin.

The susceptor may be arranged between the core and the exterior surface.

The microwave system may include a waveguide. The core may be arranged between the susceptor and the waveguide.

The microwave system may include a waveguide. The waveguide may be configured with the second skin.

The acoustic panel may include a perforated skin that forms the exterior surface. The perforated skin may include a plurality of perforated layers bonded together. One of the perforated layers may be configured as or otherwise include the susceptor.

The acoustic panel may include a perforated skin that forms the exterior surface. The perforated skin may include a first layer, a second layer and a third layer. The third layer may be disposed between and bonded by a microwave transparent adhesive to the first layer and the second layer. The third layer may be configured as or otherwise include the susceptor.

The first layer and/or the second layer may include fiberglass.

The susceptor may be configured from or otherwise include a layer of metal.

The microwave system may include a waveguide configured to direct the microwaves to the susceptor.

The waveguide may be configured as or otherwise include a hollow waveguide.

The waveguide may be configured as or otherwise include a microstrip waveguide.

The microwaves may be transmitted at a frequency between one gigahertz (1 GHz) and ten gigahertz (10 GHz).

The microwaves may be transmitted at a frequency between sixty gigahertz (60 GHz) and seventy-seven gigahertz (77 GHz).

The microwave system may include a microwave source configured as a magnetron, a klystron, a gyrotron or a solid state source.

The assembly may also include a nacelle structure. This nacelle structure may include the acoustic panel.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
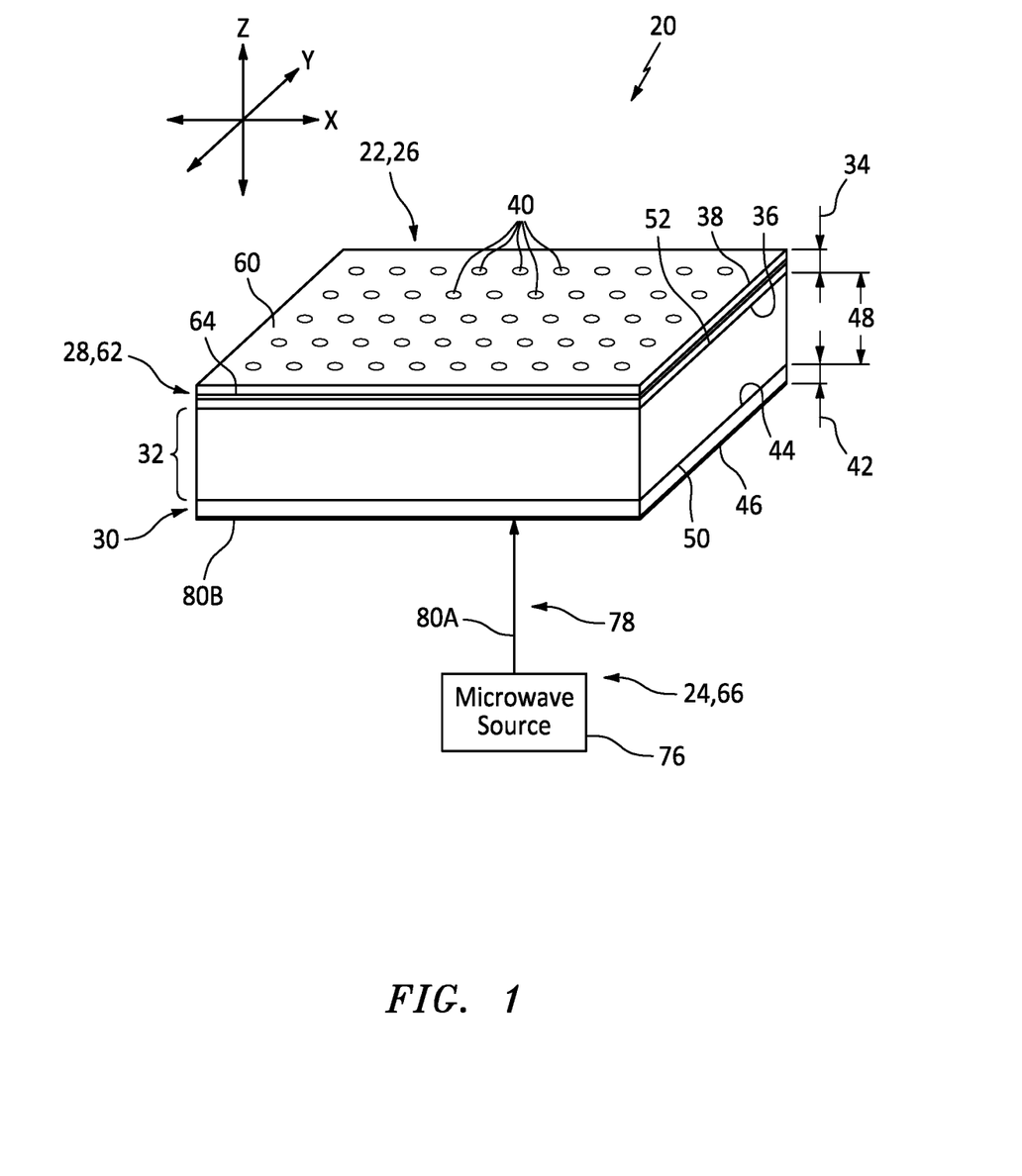
FIG. 1 is a schematic illustration of a portion of an aircraft assembly with an acoustic panel and a thermal anti-icing system.

FIG. 1 illustrates an assembly 20 for an aircraft. This aircraft assembly 20 includes an aircraft structure 22 and a microwave thermal anti-icing system 24.

The aircraft structure 22 includes at least one acoustic panel 26. This acoustic panel 26 is configured to attenuate sound; e.g., noise. The acoustic panel 26 of FIG. 1, for example, may be configured to attenuate sound generated by an aircraft propulsion system such as, for example, a turbofan propulsion system or a turbojet propulsion system. With such a configuration, the acoustic panel 26 may be configured with a nacelle of the propulsion system; e.g., the aircraft structure 22 may be a nacelle structure. The acoustic panel 26, for example, may be configured as or otherwise included as part of a noselip, an inner barrel, and outer barrel, etc. Alternatively, the acoustic panel 26 may be configured with another component/structure of the aircraft such as its fuselage or a wing. Furthermore, the acoustic panel 26 may be configured to also or alternatively attenuate aircraft related sound other than sound generated by the propulsion system.

The acoustic panel 26 extends laterally in a first lateral direction (e.g., an x-axis direction) along an x-axis. The acoustic panel 26 extends laterally in a second lateral direction (e.g., a y-axis direction) along a y-axis. The acoustic panel 26 extends vertically in a vertical direction (e.g., a z-axis direction) along a z-axis. Note, the term "lateral" may be used herein to generally describe the first lateral direction, the second lateral direction and/or any other direction within the x-y plane. Also note, the term "vertical" may be used herein to describe a depthwise panel direction and is not limited to a gravitational up/down direction. Furthermore, for ease of illustration, the x-y plane is shown as a generally flat plane. However, in other embodiments, the x-y plane and, thus, the acoustic panel 26 may be curved and/or follow an undulating geometry. For example, the x-y plane and, thus, the acoustic panel 26 may be arcuate, cylindrical, conical, frustoconical, or tapered with or without radial undulations. In such embodiments, a solely vertical direction (e.g., z-axis direction) is defined relative to a position of interest on the x-y plane. For example, on a spherical x-y plane, the vertical direction (e.g., z-axis) direction is a radial direction.

The acoustic panel 26 of FIG. 1 includes a perforated first skin 28 and a solid, non-perforated second skin 30. The acoustic panel 26 of FIG. 1 also includes a cellular core 32 arranged vertically between and connected to (e.g., bonded to, laid up integral with, etc.) the first skin 28 and the second skin 30.

The first skin 28 may be configured as a face skin and/or an exterior skin of the acoustic panel 26. This first skin 28 is configured as a relatively thin layer of material that extends laterally within the x-y plane. The first skin 28 has a vertical thickness 34. This first skin vertical thickness 34 extends vertically between opposing side surfaces 36 and 38 of the first skin 28. The first skin 28 includes a plurality of perforations 40; e.g., apertures such as through-holes. Each of these first skin perforations 40 extends generally vertically through the first skin 28 between the first skin side surfaces 36 and 38.

The second skin 30 may be configured as a back skin and/or an interior skin of the acoustic panel 26. This second skin 30 is configured as a relatively thin layer of (e.g., continuous and uninterrupted) material that extends laterally within the x-y plane. The second skin 30 has a vertical thickness 42. This second skin vertical thickness 42 extends vertically between opposing side surfaces 44 and 46 of the second skin 30. The second skin vertical thickness 42 may be substantially equal to or different (e.g., greater or less) than the first skin vertical thickness 34.

The cellular core 32 extends laterally within the x-y plane. The cellular core 32 has a vertical thickness 48. This core vertical thickness 48 extends vertically between opposing sides 50 and 52 of the cellular core 32, which core sides 52 and 50 are respectively abutted against the interior first skin side surface 36 and the interior second skin side surface 44. The core vertical thickness 48 may be substantially greater than the first skin vertical thickness 34 and/or the second skin vertical thickness 42. The core vertical thickness 48, for example, may be at least ten to forty times (10-40×), or more, greater than the vertical thickness 34, 42; however, the acoustic panel 26 of the present disclosure is not limited to such an exemplary embodiment.

Figure 2:
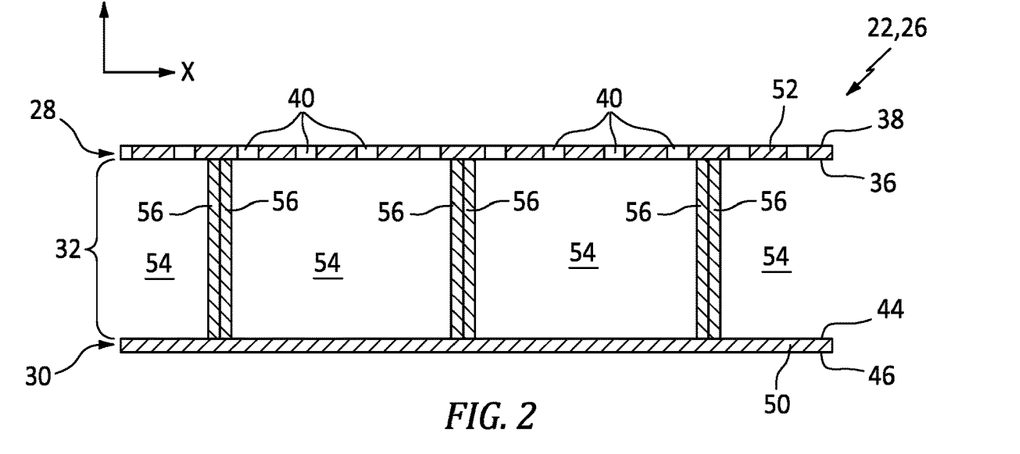
FIG. 2 is a sectional illustration of a portion of the acoustic panel.
Figure 3:
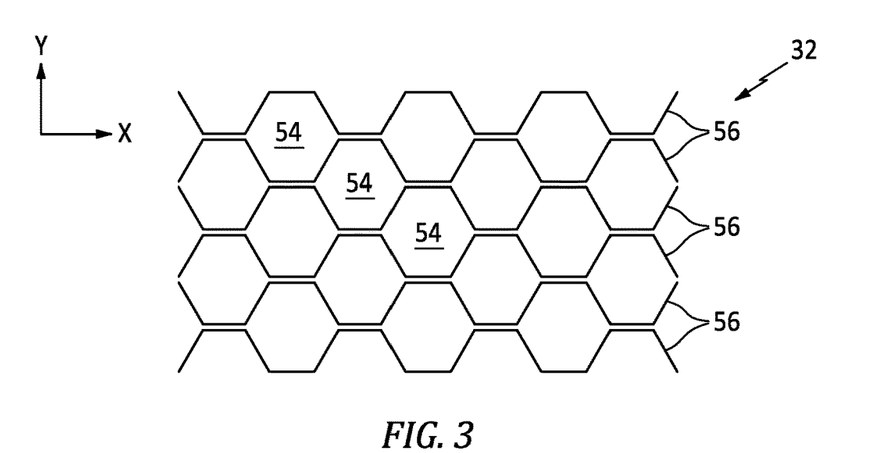
FIG. 3 is a side view illustration of a portion of a cellular core for the acoustic panel.
Figure 4:
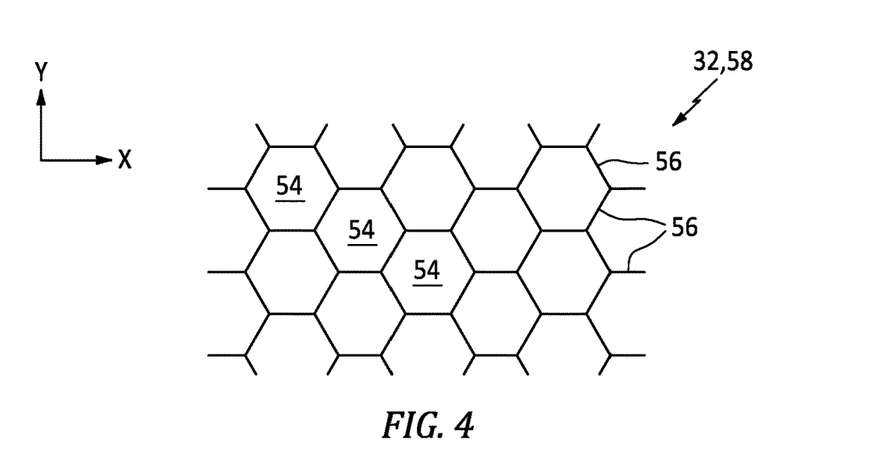
FIG. 4 is a side view illustration of a portion of another cellular core for the acoustic panel.

Referring to FIG. 2, the cellular core 32 is configured to form one or more cavities 54 vertically between the first skin 28 and the second skin 30. Referring to FIGS. 2 and 3, the cellular core 32 may be configured as a honeycomb core. The cellular core 32 of FIGS. 2 and 3, for example, includes a plurality of corrugated sidewalls 56. These sidewalls 56 are arranged in a side-by-side array and connected to one another such that each adjacent (e.g., neighboring) pair of the sidewalls 56 forms an array of the cavities 54 laterally therebetween. Of course, in other embodiments, the sidewalls 56 may be formed integral with one other as a cellular grid structure 58 as shown, for example, in FIG. 4.

Referring to FIG. 2, each of the cavities 54 extends vertically through the cellular core 32 to and between the first skin 28 and its interior side surface 36 and the second skin 30 and its interior side surface 44. Referring to FIG. 3, one or more or all of the cavities 54 may each have a polygonal (e.g., hexagonal) cross-sectional geometry when viewed in a plane parallel to one or more of the elements 28, 30 and/or 32 (see FIG. 2); e.g., perpendicular to the z-axis. The present disclosure, however, is not limited to the foregoing exemplary cellular core configuration. In particular, various other types of honeycomb cores and, more generally, various other types of cellular cores for an acoustic panel are known in the art, and the present disclosure is not limited to any particular ones thereof.

Referring to FIG. 2, one or more or all of the cavities 54 are each fluidly coupled with a respective set of one or more of the first skin perforations 40. Each respective cavity 54 may thereby be configured as a resonance chamber. Sound waves, for example, may enter each respective cavity 54 through the respective first skin perforation(s) 40. These sound waves may travel within the cavity 54 to the second skin 30, where the second skin 30 may reflect the sound waves back through the respective cavity 54 to the respective first skin perforation(s) 40. With such an arrangement, each respective cavity 54 (e.g., resonance chamber) may reverse phase of the sound waves using known acoustic reflection principles and subsequently direct the reverse phase sound waves out of the acoustic panel 26 through the respective first skin perforation(s) 40 to destructively interfere with other incoming sound waves. The acoustic panel 26 may thereby attenuate noise.

Referring to FIG. 1, the thermal anti-icing system 24 is configured to melt and/or prevent ice accumulation on an exterior surface 60 of an exterior skin 62 of the aircraft structure 22; e.g., the exterior first skin side surface 38 of the acoustic panel 26. The thermal anti-icing system 24 of FIG. 1 includes at least one susceptor 64 and a microwave system 66.

Figure 5:
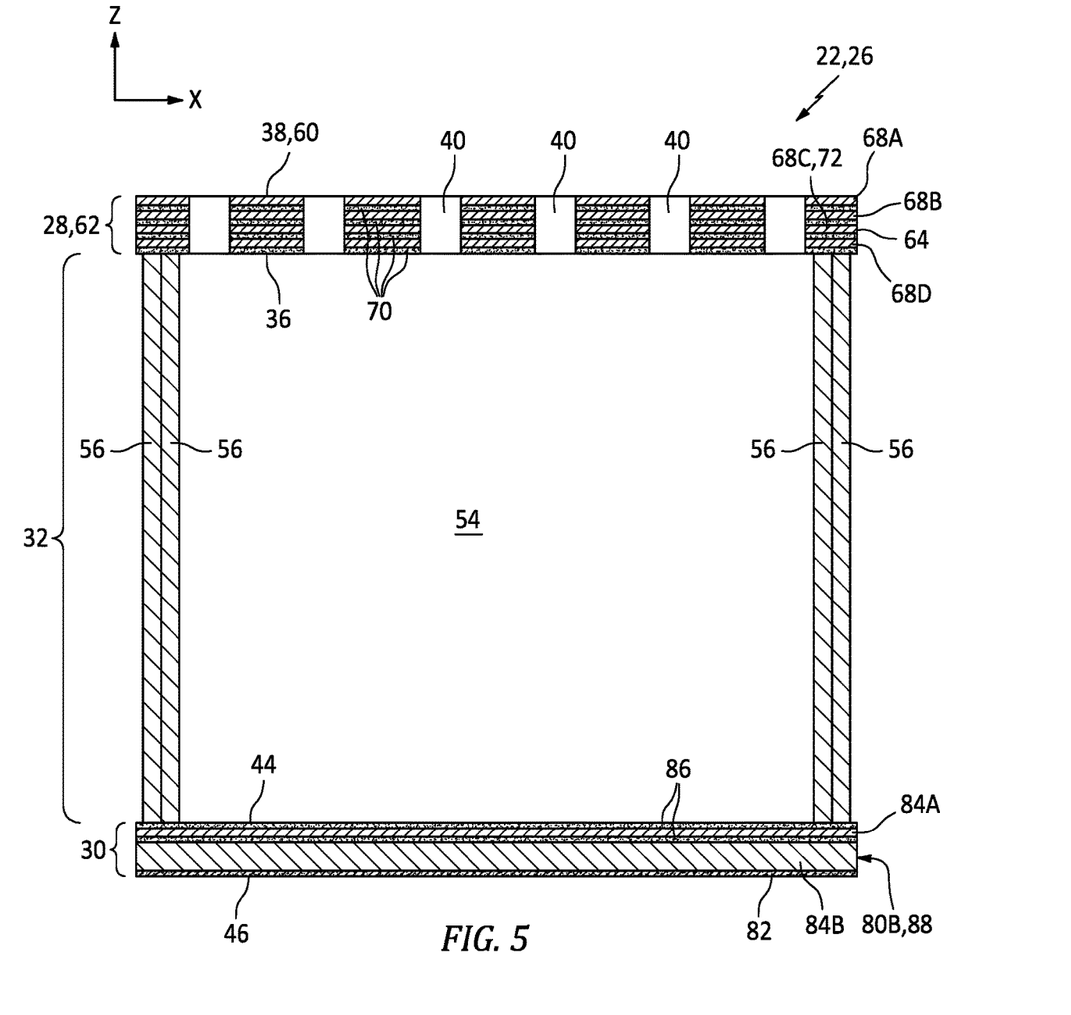
FIG. 5 is a sectional illustration of a portion of the acoustic panel configured with a susceptor and a waveguide.

Referring to FIG. 5, the susceptor 64 is configured to absorb electromagnetic energy (e.g., microwave radiation, also referred to as "microwaves") and convert that absorbed electromagnetic energy into heat. The susceptor 64, for example, may be configured as a thin layer (or strip, or wire) of material. Examples of the susceptor material may include, but are not limited to: aluminum (Al) or an alloy thereof; ferrous metal such as stainless steel; titanium (Ti) or an alloy thereof; Inconel alloys; chromium (Cr) or an alloy thereof; graphite; composites of metal(s) and ceramic(s) (e.g., cermets); doped silicon carbide; and/or metal oxide(s). The present disclosure, however, is not limited to the foregoing exemplary susceptor materials.

The susceptor 64 is configured with the acoustic panel 26, and thermally coupled with the aircraft structure exterior surface 60; e.g., the exterior first skin side surface 38 of the acoustic panel 26. The susceptor 64 of FIG. 5, for example, is configured with the acoustic panel first skin 28.

The susceptor 64 of FIG. 5 is formed as part of the first skin 28. The first skin 28 of FIG. 5, for example, includes one or more first skin layers 68A-D (generally referred to as "68"); e.g., intra-skin perforated layers. These first skin layers 68 are arranged together in a stack to form the first skin 28, where each first skin perforation 40 extends vertically sequentially through each of the first skin layers 68. The first skin layers 68 are bonded to one another by an adhesive 70; e.g., a microwave transparent adhesive. Examples of the adhesive 70 may include, but are not limited to, thermoset epoxy resin or any other bonding material with low dielectric loss. The present disclosure, however, is not limited to the foregoing exemplary adhesive materials.

The interior first skin layer 68D may form the interior first skin side surface 36 that engages and is bonded to the cellular core 32. The exterior first skin layer 68A may form the aircraft structure exterior skin 62; e.g., the exterior first skin side surface 38 of the acoustic panel 26. The intermediate first skin layers 68B and 68C are arranged vertically between the other first skin layers 68A and 68D.

At least one of the first skin layers 68 (e.g., 68C) may at least partially or completely form the susceptor 64. The (e.g., interior) intermediate first skin layer 68C of FIG. 5, for example, forms the susceptor 64. More particularly, the intermediate first skin layer 68C of FIG. 5 is the thin layer of the susceptor material that forms the susceptor 64. The susceptor 64 may thereby be located at (e.g., on, adjacent or proximate) the aircraft structure exterior surface 60/the exterior first skin side surface 38. For ease of description, this intermediate first skin layer 68C that forms the susceptor 64 may be referred to below as a susceptor layer 72.

One or more of the remaining first skin layers 68A, 68B and 68D may be configured as structural layers, support layers and/or filler layers. Each of these remaining first skin layers 68A, 68B and 68D may be configured as a thin sheet of reinforcement material embedded within (or otherwise arranged with) a matrix. The reinforcement material may include fibrous and/or granular (e.g., powder) material that is transparent to the electromagnetic energy; e.g., the microwave radiation. Examples of the reinforcement material may include, but are not limited to, fiberglass or any other material with low dielectric loss. The matrix material is a bonding material that is also transparent to the electromagnetic energy; e.g., the microwave radiation. This matrix material may be the same type as (or may be) the adhesive 70 (e.g., a microwave transparent adhesive) bonding the first skin layers 68 together. In other embodiments, however, the matrix material may be different than, but complementary to for example, the adhesive 70 material. The present disclosure, however, is not limited to the foregoing exemplary reinforcement or matrix materials.

Each of the first skin layers 68 has a vertical thickness along the z-axis. The susceptor layer 72 vertical thickness may be equal to or different (e.g., less or greater) than the vertical thicknesses of the remaining first skin layers 68A, 68B and 68D. Generally speaking, the susceptor layer 72 vertical thickness is selected based on a frequency of interest of the electromagnetic radiation. The susceptor layer 72 vertical thickness may also or alternatively be selected to be one-quarter (¼) of a wavelength of the electromagnetic radiation at the frequency of interest. The present disclosure, however, is not limited to such exemplary susceptor layer vertical thicknesses.

Figure 6A:
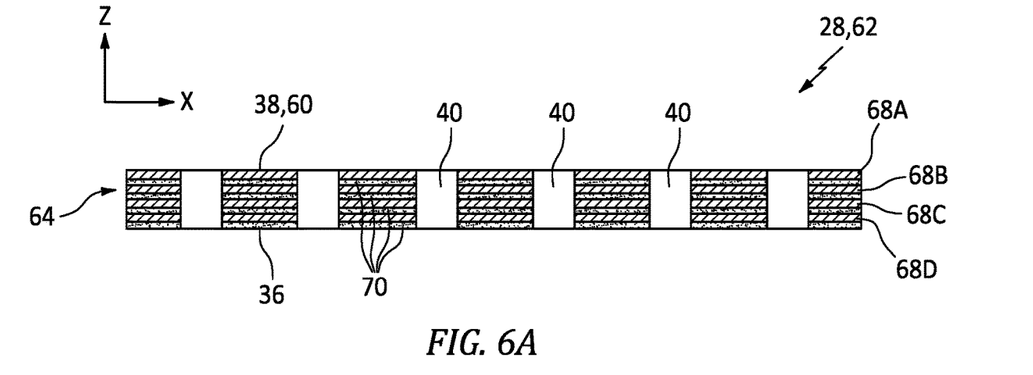
FIGS. 6A-C are sectional illustrations of portions of various first skin configurations for the acoustic panel.
Figure 6B:
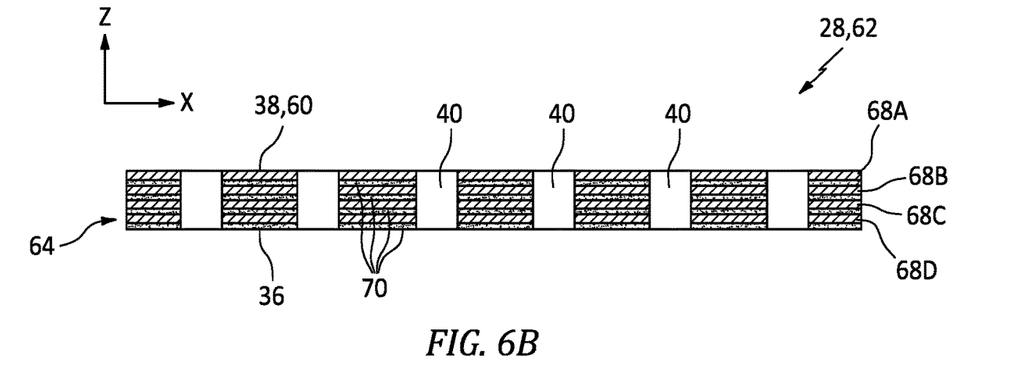
Figure 6C:
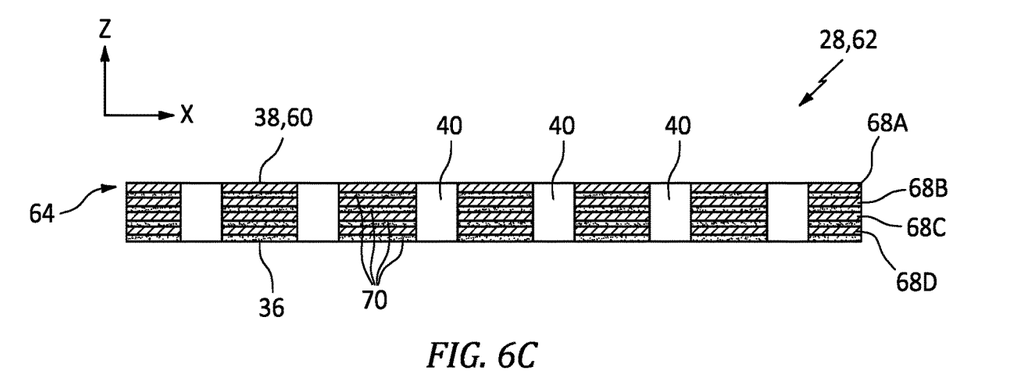

The intermediate first skin layer 68C is described above as forming the susceptor 64. The present disclosure, however, is not limited to such an exemplary construction. For example, in some embodiments, referring to FIG. 6A, the susceptor 64 may alternatively (or also) be formed by another one of the intermediate first skin layers (e.g., 68B). In some embodiments, referring to FIG. 6B, the susceptor 64 may alternatively (or also) be formed by the interior first skin layer 68D. In some embodiments, referring to FIG. 6C, the susceptor 64 may alternatively (or also) be formed by the exterior first skin layer 68A. With each of the foregoing configurations, the susceptor 64 is arranged vertically between the cellular core 32 (see FIG. 5) and the aircraft structure exterior surface 60/the exterior first skin side surface 38.

Figure 7A:
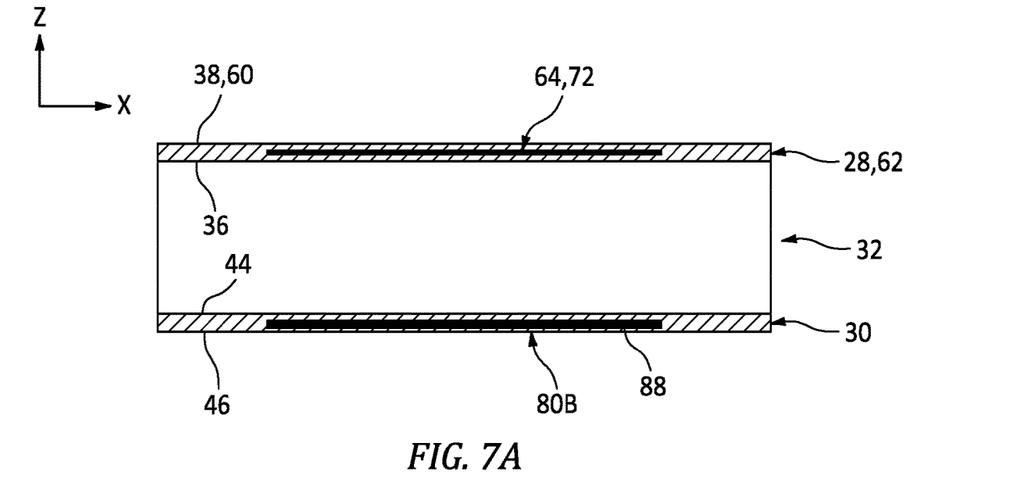
FIGS. 7A and 7B are sectional schematic illustrations of portions of the acoustic panel with various susceptor and waveguide arrangements.
Figure 7B:
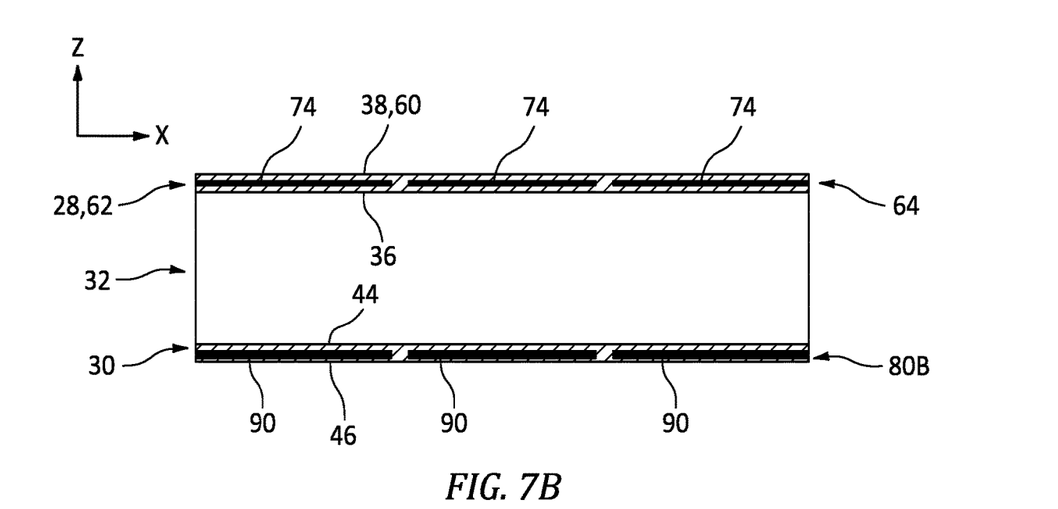

Referring to FIG. 5, the susceptor 64 is configured to laterally overlap (along the x-axis and/or the y-axis) an entirety of the aircraft structure exterior surface 60/the exterior first skin side surface 38. The susceptor 64, for example, may extend along an entire lateral extent of the aircraft structure exterior skin 62/the acoustic panel first skin 28. Alternatively, the susceptor 64 may laterally overlap (along the x-axis and/or the y-axis) a portion of the aircraft structure exterior surface 60/the exterior first skin side surface 38. For example, referring to FIG. 7A, the susceptor layer 72 may be configured as a strip of material with a lateral width (along the x-axis and/or the y-axis) that is less than a lateral width of the first skin 28 and its other first skin layers 68. With such an arrangement, thermal anti-icing of the exterior surface 38, 60 may be focused to a select region corresponding to the susceptor 64. In other embodiments, referring to FIG. 7B, the susceptor 64 may include one or more (e.g., discrete or interconnected) susceptor segments 74. Each of these susceptor segments 74 may focus thermal anti-icing to multiple corresponding regions, or provide effective coverage for the entire exterior surface 38, 60. Note, FIGS. 7A and 7B illustrate the acoustic panel 26 without the first skin perforations 40 for ease of illustration.

Referring to FIG. 1, the microwave system 66 includes a microwave source 76 and a microwave transmission system 78. The microwave source 76 may be configured to generate microwaves at a frequency of, for example, between 2.3 gigahertz (GHz) and 2.6 gigahertz; e.g., at exactly or about (e.g., +/−0.01 or 0.02) 2.45 gigahertz (GHz). Of course, in other embodiments, the microwave source 76 may generate the microwaves at a frequency at or above 2.6 gigahertz. In still other embodiments, the microwave source 76 may generate the microwaves at a frequency at or below 2.3 gigahertz. For example, the microwave source 76 may be configured to generate microwaves at a frequency between one and ten gigahertz, or between one and three gigahertz, or between 2.2 and 2.7 gigahertz.

The microwave source 76 may be configured as or otherwise include a vacuum electron device (VED) such as, but not limited to, a magnetron, a klystron and a gyrotron. The microwave source 76 may alternatively be configured as or otherwise include a solid state device; e.g., a solid state microwave source. Such a solid state device may include one or more radio-frequency (RF) transistors configured to generate the microwaves. Generally speaking, a solid state device may have some advantages over a vacuum electron device. For example, a solid state device may require less (e.g., 10-100× less) operational power than a vacuum electron device; e.g., 20-50 volts versus 4000 volts. A solid state device may have a longer useful lifetime than a vacuum electron device; e.g., 15-20 plus years versus 500-1000 hours. A solid state device may have a lower mass and, thus, weigh less than a vacuum electron device. A solid state device may have improved control over a vacuum electron device.

The microwave source 76 may be configured to generate a continuous output (e.g., stream) of the microwaves. The microwave source 76 may also or alternatively be configured to generate an intermittent (e.g., pulsed) output of the microwaves.

The microwave transmission system 78 is configured to transmit the microwaves generated by the microwave source 76 to a desired location or locations. The microwave transmission system 78 is further configured to selectively direct the microwaves at/to the susceptor 64 as described below in further detail.

The microwave transmission system 78 includes one or more waveguides 80A and 80B (generally referred to as "80"); e.g., electromagnetic feed lines. The upstream waveguide 80A is coupled with the microwave source 76, and is configured to transmit the microwaves generated by the microwave source 76 to the downstream waveguide 80B. The downstream waveguide 80B is configured to direct the microwaves received from the upstream waveguide 80A at/to the susceptor 64. These waveguides 80 may be configured as segments of a common waveguide. Alternatively, the waveguides 80 may be configured as discrete waveguide with common or different configurations.

The waveguides 80 may be configured as dielectric waveguides. Examples of a dielectric waveguide include, but are not limited to, an optical fiber, a microstrip, a coplanar waveguide, a stripline and a coaxial cable. Each dielectric waveguide may be constructed from or otherwise include a fluoropolymer such as, but not limited to, polytetrafluoroethylene (PTFE) (e.g., Teflon® material) or polyvinylidene fluoride (PVDF). The dielectric waveguide may also or alternatively include other polymeric materials and/or ceramics. The present disclosure, however, is not limited to the foregoing exemplary waveguide materials, nor to dielectric waveguides as discussed below in further detail.

Referring to FIG. 5, the dielectric waveguide may be at least partially or completely covered by an insulating material 82. This insulating material 82 is a microwave resistive material such as, but not limited to, metal or alumina (e.g., Al$_2$O$_3$) or silica (e.g., SiO$_3$). The present disclosure, however, is not limited to the foregoing exemplary insulating materials. At least one side of the downstream waveguide 80B may be configured at least partially or completely without the insulting material to facilitate directing the microwaves from the dielectric waveguide towards/to the susceptor 64. Of course, in other embodiments, the downstream waveguide 80B may be completely covered with the insulating material 82, where one or more perforations pierce through the insulating material 82 to facilitate directing of the microwaves.

Referring to FIG. 5, the downstream waveguide 80B is configured with the acoustic panel 26. The downstream waveguide 80B of FIG. 5, for example, is configured with the acoustic panel second skin 30.

The downstream waveguide 80B of FIG. 5 is formed as part of the second skin 30. The second skin 30 of FIG. 5, for example, includes one or more second skin layers 84A and 84B (generally referred to as "84"); e.g., intra-skin layers. These second skin layers 84 are arranged together in a stack to form the second skin 30. The second skin layers 84 are bonded to one another by an adhesive 86; e.g., a microwave transparent adhesive. This adhesive 86 may be the same type as the adhesive 70 in the first skin 28; however, the present disclosure is not limited thereto. Examples of the adhesive 86 may include, but are not limited to, thermoset epoxy resin or any other bonding material with low dielectric loss. The present disclosure, however, is not limited to the foregoing exemplary adhesive materials.

The interior second skin layer 84A may form the interior second skin side surface 44 that engages and is bonded to the cellular core 32. The exterior second skin surface 84B may form the exterior second skin side surface 46, which is vertically opposite the aircraft structure exterior surface 60/the exterior first skin side surface 38.

At least one of the second skin layers 84 (e.g., 84B) may at least partially or completely form the downstream waveguide 80B. The exterior second skin layer 84B of FIG. 5, for example, forms the downstream waveguide 80B. More particularly, the exterior second skin layer 84B of FIG. 5 includes a thin layer of dielectric waveguide material that forms the downstream waveguide 80B. The downstream waveguide 80B may thereby be located at (e.g., on, adjacent or proximate) the exterior second skin side surface 46. For ease of description, this second skin layer 84B that forms the second waveguide may be referred to below as a waveguide layer 88.

The remaining second skin layer 84A may be configured as a structural layer, a support layer and/or a filler layer. The interior second skin layer 84A of FIG. 5, for example, may be configured as a thin sheet of reinforcement material embedded within (or otherwise arranged with) a matrix. The reinforcement material may include fibrous and/or granular (e.g., powder) material that is transparent to the electromagnetic energy; e.g., the microwave radiation. Examples of the reinforcement material may include, but are not limited to, fiberglass or any other material with low dielectric loss. The matrix material is a bonding material that is also transparent to the electromagnetic energy; e.g., the microwave radiation. This matrix material may be the same type as (or may be) the adhesive 86 (e.g., a microwave transparent adhesive) bonding the second skin layers 84 together. In other embodiments, however, the matrix material may be different than, but complementary to for example, the adhesive 86 material. The present disclosure, however, is not limited to the foregoing exemplary reinforcement or matrix materials.

Each of the second skin layers 84 has a vertical thickness along the z-axis. The waveguide layer 88 vertical thickness may be equal to or different (e.g., less or greater) than the vertical thicknesses of the remaining second skin layer 84A.

Figure 8:
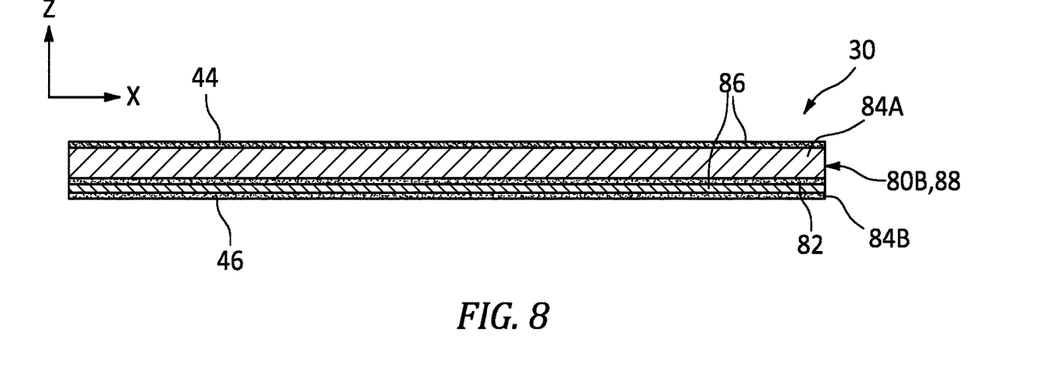
FIG. 8 is a sectional illustration of a portion of another second skin configuration for the acoustic panel.

The exterior second skin layer 84B is described above as forming the downstream waveguide 80B. The present disclosure, however, is not limited to such an exemplary construction. For example, in some embodiments, referring to FIG. 8, the downstream waveguide 80B may alternatively (or also) be formed by the interior second skin layer 84A, or another (e.g., intermediate) second skin layer when included. With each of the foregoing configurations, the downstream waveguide 80B is arranged vertically between the cellular core 32 (see FIG. 5) and the exterior second skin side surface 46. Referring to FIG. 5, at least the cellular core 32 is arranged vertically between and separates the downstream waveguide 80B and the susceptor 64.

The downstream waveguide 80B is configured to laterally overlap (along the x-axis and/or y-axis) an entirety of the susceptor 64. The downstream waveguide 80B, for example, may extend along the entire lateral extent of the acoustic panel second skin 30. Alternatively, the downstream waveguide 80B may laterally overlap (along the x-axis and/or the y-axis) a portion of the second skin 30 as well as a portion of the exterior first skin side surface 38, which corresponds to the susceptor 64. For example, referring to FIG. 7A, the waveguide layer 88 may be configured as a strip of material with a lateral width (along the x-axis and/or the y-axis) that is less than the lateral width of the second skin 30. In other embodiments, referring to FIG. 7B, the downstream waveguide 80B may include one or more (e.g., discrete or interconnected) waveguide segments 90. Each of these waveguide segments 90 may focus the microwaves to a respective one of the susceptor segments 74.

Figure 9:
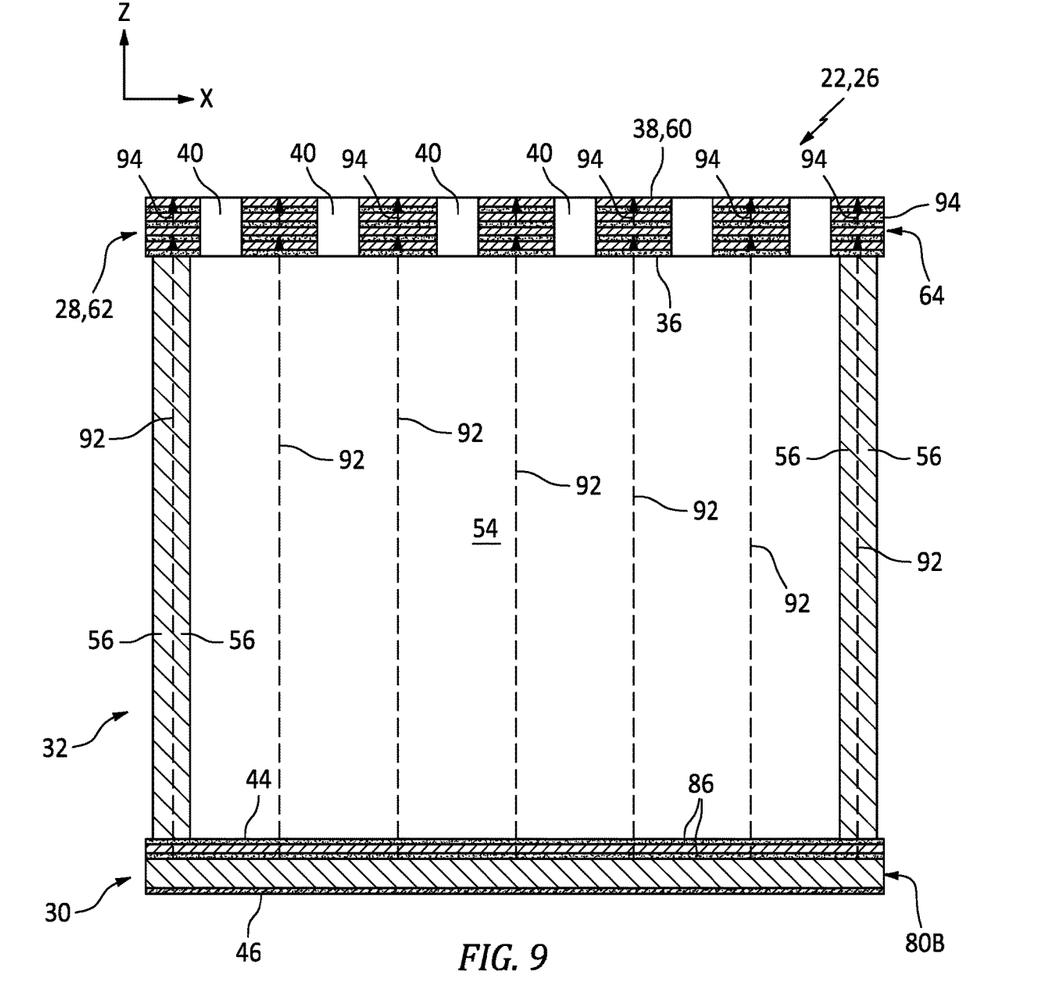
FIG. 9 is a sectional illustration of the acoustic panel portion of FIG. 5 during operation of the thermal anti-icing system.

During operation of the thermal anti-icing system 24 of FIG. 1, the microwave source 76 generates microwaves. These microwaves are received by the downstream waveguide 80B through the upstream waveguide 80A. Referring to FIG. 9, the downstream waveguide 80B selectively directs the received microwaves 92 towards/to the susceptor 64 through the cellular core 32 as well as one or more other layers of the skin(s) 28 and/or 30. These transmitted microwaves impinge against and are absorbed by the susceptor 64, and are then transformed by the susceptor 64 into thermal energy 94. This thermal energy 94 may be transferred via conduction from the susceptor 64 into a region of the aircraft structure exterior skin 62 adjacent and/or proximate the susceptor 64. This transfer of the thermal energy 94 may heat the region of the aircraft structure exterior skin 62 and thereby melt and/or prevent ice accumulation over and/or about the aircraft structure exterior skin region.

To facilitate transmission of the microwaves through the cellular core 32, the cellular core 32 may be constructed from dielectric material. This dielectric material may be or otherwise include a polymer (e.g., a fluoropolymer) such as, but not limited to, polytetrafluoroethylene (PTFE) (e.g., Teflon® material) or polyvinylidene fluoride (PVDF). The dielectric material may include fibrous material (e.g., glass fibers) within a polymer matrix. The dielectric material may also or alternatively include other polymeric materials and/ or ceramics. For example, the dielectric material may include: ceramic matrix composite (CMC), alumina, silica, silicon carbide, silicon oxynitride, borosilicate glass, Pyrex, or other (e.g., "microwave safe") dielectrics used for conventional household microwave ovens. The present disclosure, however, is not limited to the foregoing exemplary dielectric materials.

Figure 10:
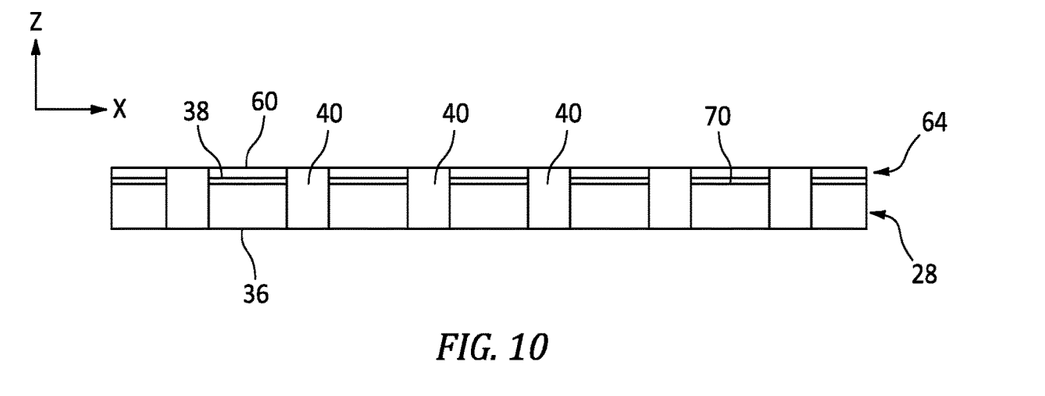
FIG. 10 is a partial sectional schematic illustration of the susceptor attached to the first skin of the acoustic panel.

In some embodiments, referring to FIG. 5 for example, the susceptor 64 may be an integral part of the first skin 28. In other embodiments, referring to FIG. 10, the susceptor 64 may be formed discrete from the first skin 28 and subsequently bonded to the first skin 28.

Figure 11:
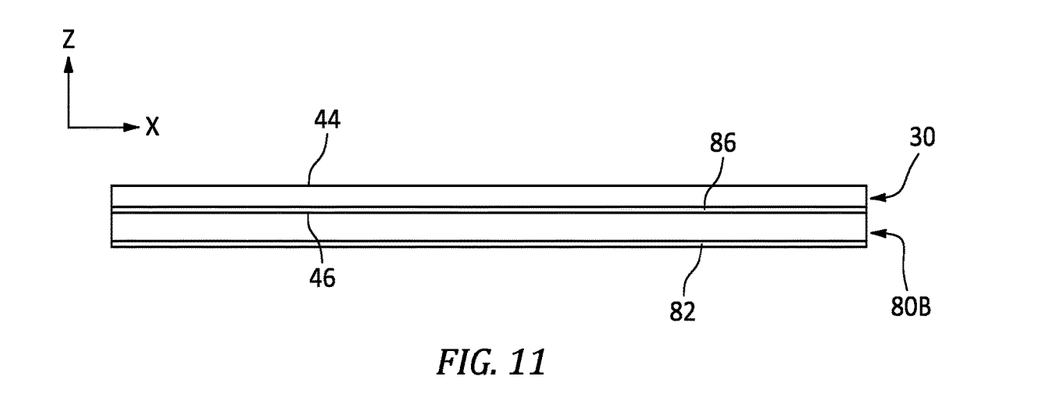
FIG. 11 is a partial sectional schematic illustration of the waveguide attached to the second skin of the acoustic panel.
Figure 12:
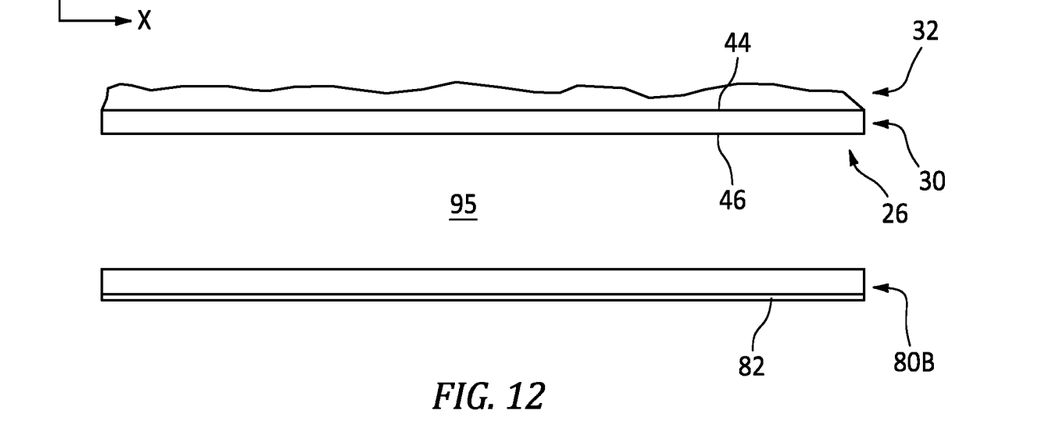
FIG. 12 is a partial sectional schematic illustration of the waveguide arranged discrete from the second skin of the acoustic panel.

In some embodiments, referring to FIG. 5 for example, the downstream waveguide 80B may be an integral part of the second skin 30. In other embodiments, referring to FIG. 11, the downstream waveguide 80B may be formed discrete from the second skin 30 and subsequently bonded to the second skin 30, printed onto the second skin 30, or otherwise attached to the second skin 30. In still other embodiments, referring to FIG. 12, the downstream waveguide 80B may be configured discrete from the acoustic panel 26 and its second skin 30. The downstream waveguide 80B of FIG. 12, for example, may be separated from the acoustic panel 26 and its second skin 30 by an air gap 95.

Figure 13A:
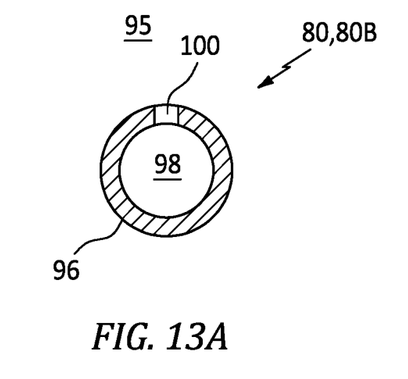
FIG. 13A is a cross-sectional illustration of a hollow waveguide.
Figure 13B:
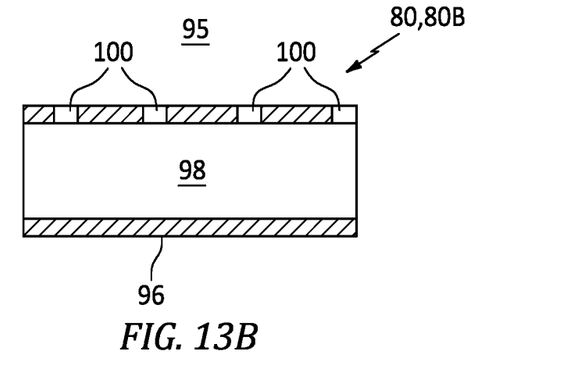
FIG. 13B is a side sectional illustration of a portion of the hollow waveguide.

In some embodiments, the waveguides 80 may be configured as dielectric waveguides as described above. In other embodiments, referring to FIGS. 13A and 13B, one or each of the waveguides 80 may alternatively be configured as a hollow waveguide. At least the downstream waveguide 80B of FIGS. 13A and 13B, for example, includes a tubular body 96 with an internal passage 98 (e.g., a bore) configured to communicate the microwaves. This tubular body 96 may include one or more apertures 100; e.g., slots, slits and/or perforations. Each of these apertures 100 extends through/pierces a sidewall of the respective waveguide 80. Each of the apertures 100 is thereby operable to direct some of the microwaves from within its internal passage 98 towards/or the susceptor 64 (see FIG. 5). Of course, various other types of microwave waveguide are known in the art, and the present disclosure is not limited to any particular ones thereof.

In addition to facilitating heating of the aircraft structure exterior skin 62 through a thermally insulating structure such as the cellular core 32, the thermal anti-icing system 24 of the present disclosure is also relatively resistant to foreign object damage (FOD). For example, during operation, the aircraft structure 22 of FIG. 1 may be subject to a foreign object impact. Under certain conditions, such an impact may crack and/or fracture, inter alia, the susceptor 64; e.g., material within the susceptor layer 72 (e.g., see FIG. 5). Even where cracked/fractured, however, the susceptor 64 may still be operable to transform the microwaves into heat energy since no electrical interconnection within the susceptor 64 is required. Furthermore, provision of the relatively light weight susceptor 64 and waveguides 80 may reduce aircraft weight by obviating the need for ducting and valve associated with a traditional forced hot air anti-icing system.

The thermal anti-icing system 24 of the present disclosure may also simplify manufacturing of the acoustic panel 26. For example, where an acoustic panel is provided with an electrical resistance heater, electrical conduction paths for that heater must be carefully mapped to ensure that those paths are not severed during perforation of its exterior skin. However, as discussed above, perforation of the susceptor 64 does not adversely impact its operation. Therefore, the first skin perforations 40 may be formed without detailed, time intensive mappings.

In some embodiments, the microwave source 76 may be tuned to an absorption frequency of the susceptor 64. This may facilitate provision of higher electromagnetic radiation frequencies, while reducing a footprint of the electromagnetic radiation. For example, the microwave source 76 may be tuned for a V-band frequency between forty gigahertz and eighty gigahertz; e.g., between 60 GHz and 77 GHz. Within such a frequency range, absorption by other aircraft structure materials is relatively low and the susceptor 64 may be made relatively small. The susceptor 64, for example, may be about 1.25 mm thick for a microwave transmission frequency of about 60 GHz. The present disclosure, however, is not limited to the forgoing exemplary frequencies or sizes.

Figure 14:
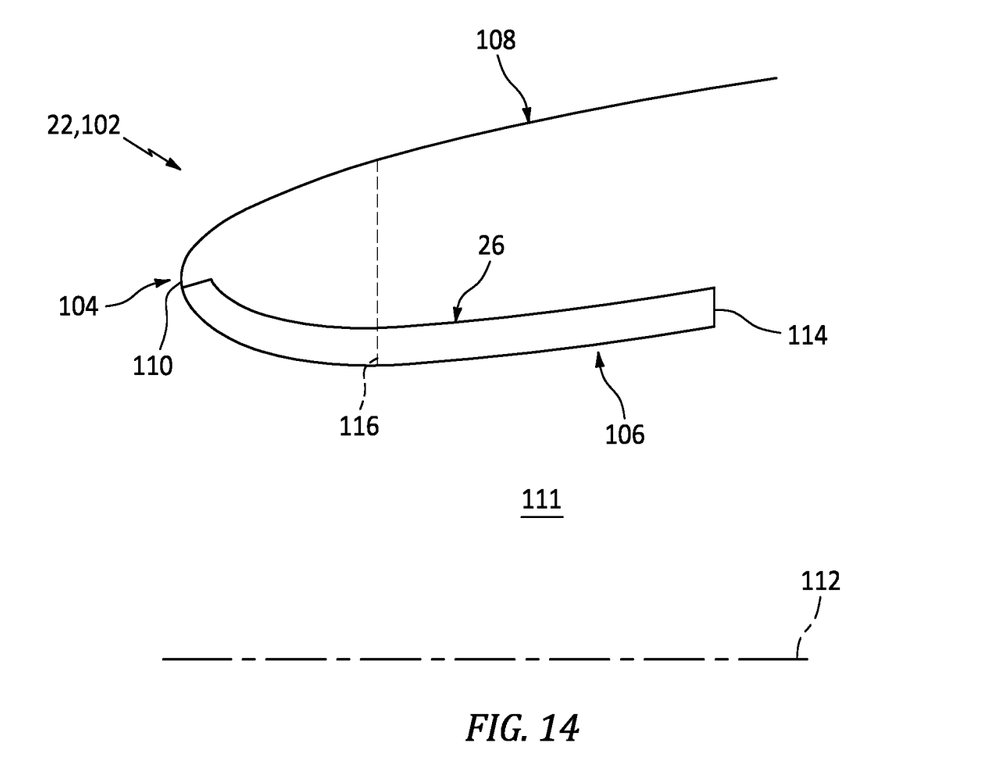
FIG. 14 is a side sectional illustration of a portion of an inlet structure for an aircraft propulsion system nacelle.

FIG. 14 illustrates an inlet structure 102 of a nacelle for an aircraft propulsion system; e.g., a turbofan or a turbojet propulsion system. This inlet structure 102 includes an inlet lip 104, an inner barrel 106 and an outer barrel 108. The inlet lip 104 forms a leading edge 110 of the inlet structure 102. The inner barrel 106 is connected to a radial inner end of the inlet lip 104, and at least partially forms an outer peripheral boundary of an inlet duct 111 into the aircraft propulsion system. The outer barrel 108 is connected to a radial outer end of the inlet lip 104, and circumscribes the inner barrel 106.

Figure 15:
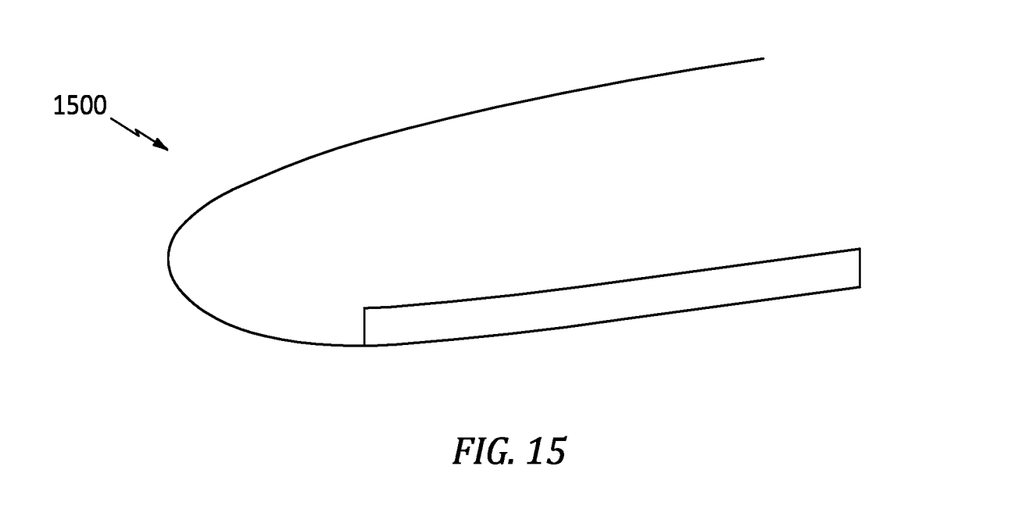
FIG. 15 is a side sectional illustration of a portion of another inlet structure for an aircraft propulsion system nacelle.

The inlet structure 102 of FIG. 14 is configured with one or more of the acoustic panels 26; one visible in FIG. 14. These acoustic panels 26 may collectively form at least an inner portion of the inlet lip 104 and an entirety (or a portion) of the inner barrel 106. Each acoustic panel 26 of FIG. 14, for example, extends axially along an axial centerline 112 of the aircraft propulsion system from (or about) the leading edge 110 to (or towards) an aft end 114 of the inner barrel 106. Each acoustic panel 26 may have an arcuate configuration, which extends partially circumferentially about the axial centerline 112. With this arrangement, sound attenuation treatment may be carried past a typical forward end location 116 of the inner barrel 106 into the inlet lip 104. An overall axial length of the inner barrel 106 and, thus, the entire inlet structure 102 may thereby be shorted while still providing a certain level of sound attenuation as well as thermal anti-icing for the inlet lip 104 as compared, for example, to a traditional inlet structure 1500 as shown in FIG. 15. Configuring the inlet structure 102 of FIG. 14 with the acoustic panel(s) 26 and the thermal anti-icing system 24 of the present disclosure may thereby facilitate a reduction in size and/or weight of the aircraft propulsion system and its nacelle.

While the acoustic panel(s) 26 and the thermal anti-icing system 24 is described above as being configured with the inlet structure 102, the present disclosure is not limited to such an exemplary application. Rather, the acoustic panel(s) 26 and the thermal anti-icing system 24 of the present disclosure may be configured with any aircraft structure which would benefit from including sound attenuation as well as de-icing capability.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft structure, comprising:
   an acoustic panel comprising an exterior surface; and
   a thermal anti-icing system comprising a susceptor and a microwave system, the susceptor configured with the acoustic panel, and the microwave system configured to direct microwaves to the susceptor for melting and/or preventing ice accumulation on the exterior surface;

wherein the acoustic panel includes a perforated skin that forms the exterior surface;

wherein the perforated skin includes a first layer, a second layer and a third layer; and wherein the third layer is disposed between and bonded by a microwave transparent adhesive to the first layer and the second layer, and the third layer comprises the susceptor.

2. The assembly of claim 1, wherein the acoustic panel includes a second skin and a core; and the core is connected to the perforated skin and the second skin, the core forms a plurality of cavities between the perforated skin and the second skin, and each of the plurality of cavities is fluidly coupled with one or more respective perforations through the perforated skin.

3. The assembly of claim 2, wherein the microwave system comprises a waveguide; and the core is arranged between the susceptor and the waveguide.

4. The assembly of claim 2, wherein the microwave system comprises a waveguide; and the waveguide is configured with the second skin.

5. The assembly of claim 1, wherein at least one of the first layer or the second layer comprises fiberglass.

6. The assembly of claim 1, wherein the susceptor comprises a layer of metal.

7. The assembly of claim 1, wherein the microwave system comprises a waveguide configured to direct the microwaves to the susceptor.

8. The assembly of claim 7, wherein the waveguide comprises a hollow waveguide.

9. The assembly of claim 7, wherein the waveguide comprises a microstrip waveguide.

10. The assembly of claim 1, wherein the microwaves are transmitted at a frequency between one gigahertz (1 GHz) and ten gigahertz (10 GHz).

11. The assembly of claim 1, wherein the microwaves are transmitted at a frequency between sixty gigahertz (60 GHz) and seventy-seven gigahertz (77 GHz).

12. The assembly of claim 1, wherein the microwave system includes a microwave source configured as a magnetron, a klystron, a gyrotron or a solid state source.

13. An assembly for an aircraft structure, comprising:

an acoustic panel comprising an exterior surface; and a thermal anti-icing system comprising a susceptor and a microwave system, the susceptor configured with the acoustic panel, and the microwave system configured to direct microwaves to the susceptor for melting and/or preventing ice accumulation on the exterior surface;

wherein the acoustic panel includes a perforated skin that forms the exterior surface; and wherein the perforated skin includes a plurality of perforated layers bonded together, a first of the plurality of perforated layers comprises the susceptor, and a second of the plurality of perforated layers is disposed between the first of the plurality of perforated layers and the exterior surface.

14. An assembly for an aircraft propulsion system, comprising:

a nacelle structure including a perforated first skin, a second skin and a cellular core arranged between and connected to the perforated first skin and the second skin; and a thermal anti-icing system comprising a susceptor and a microwave system, the susceptor embedded within the perforated first skin, and the microwave system configured to direct microwaves through the cellular core to the susceptor for melting and/or preventing ice accumulation on a perforated exterior surface of the nacelle structure.

15. The assembly of claim 14, wherein the microwave system includes a microwave source and a waveguide;

the microwave source is configured to generate the microwaves; and the waveguide is arranged with the second skin, and the waveguide is configured to receive the microwaves from the microwave source and then direct the microwaves to the susceptor.

* * * * *